T. S. GLOVER.
CARBURETER.
APPLICATION FILED MAR. 25, 1915.

1,167,290.

Patented Jan. 4, 1916.

Witnesses
Fenton S. Belt
J. W. Sherwood

Inventor
T. S. Glover
By Franklin H. Hough
Attorney

UNITED STATES PATENT OFFICE.

THEODORE S. GLOVER, OF SARANAC LAKE, NEW YORK, ASSIGNOR OF ONE-HALF TO CLAYTON M. BESSETT, OF SARANAC LAKE, NEW YORK.

CARBURETER.

1,167,290.  Specification of Letters Patent.  Patented Jan. 4, 1916.

Application filed March 25, 1915. Serial No. 16,964.

*To all whom it may concern:*

Be it known that I, THEODORE S. GLOVER, a citizen of the United States, residing at Saranac Lake, in the county of Franklin and State of New York, have invented certain new and useful Improvements in Carbureters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in carbureters and the object in view is to produce a simple and efficient apparatus of this nature comprising a wick through which the gasolene is drawn by capillary attraction from a reservoir chamber, means being provided for introducing the air in contact with the opposite walls of the wick and mixing with the gasolene and thereby preventing the latter from being sprayed into the motor in the form of a moist vapor.

Another object of the invention is to produce a carbureter so arranged that the wick will prevent water being drawn in volume and mixed with the gasolene and which would tend to destroy the gas mixture, the wick also interfering with dirt and sediment passing into the gas.

Another object of the invention is in the provision of a wick so constructed as to prevent flooding of the carbureter as it is not necessary that the gasolene be at any particular height as long as the wick trails in the gasolene sufficiently to allow for capillary attraction of the fuel, causing the liquid to be exposed to the passage of air where it is mixed therewith and not sprayed as a vapor as is commonly the method in ordinary types of carbureters.

The invention comprises various details of construction, combinations and arrangements of parts, as will be fully hereinafter described, shown in the accompanying drawings and then specifically defined in the appended claims.

Figure 1:
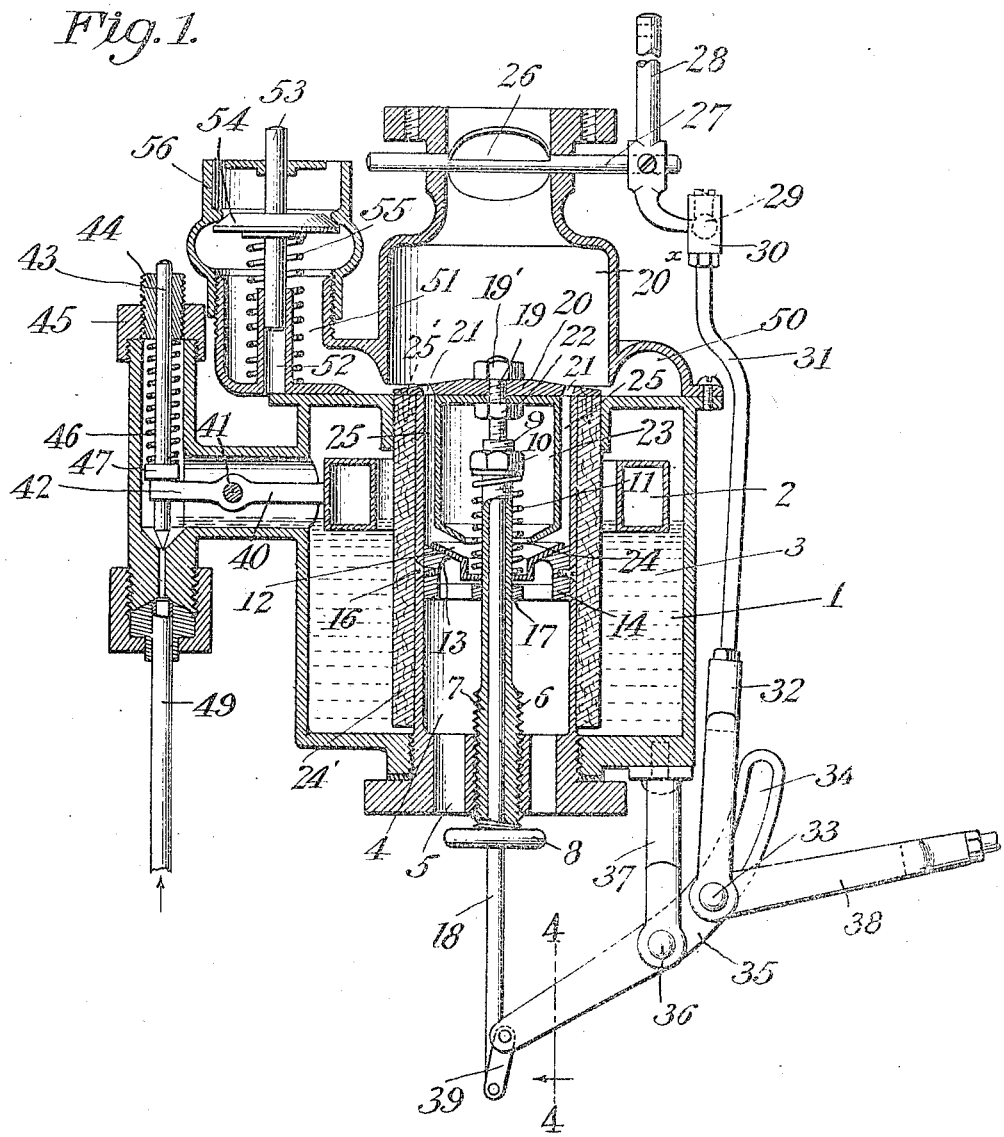
Figure 2:
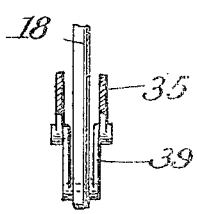

I illustrate my invention in the accompanying drawings, in which:

Figure 1 is a central vertical sectional view through the carbureter. Fig. 2 is a sectional view on line 4—4 of Fig. 1.

Reference now being had to the details of the drawings by numeral, 1 designates the body of the carbureter forming a float chamber in which a float 2 with circular opening is mounted and adapted to rise and lower upon the surface of the gasolene, designated by numeral 3. Mounted within said casing is a sleeve 4 which is exteriorly threaded to engage threads formed in the opening in the bottom of said casing and the lower part of the sleeve is hexagonal and is provided with a series of apertures 5 through which air is allowed to enter into the interior of the sleeve. The lower end of the sleeve is provided with a threaded aperture to receive the circumferential threads 6 upon the wick adjusting tube 7, which latter has a hand wheel 8 fixed to its lower end. Said tube is exteriorly threaded as at 9 near its upper end to receive the nut 10, and 11 is a spring mounted about the tube and bearing intermediate the nut and a valve 12 which is designed to be held by the spring against the beveled valve seat 13 formed in the ring 14 which is held by screws 16 to the sleeve, said ring having a centrally disposed aperture 17 for the reception of the hollow tube. A solid rod 18 has a longitudinal movement through the hollow tube and its upper end is exteriorly threaded as at 19 and passed through a central opening in the plate 20, which latter is apertured as at 21 and a jam nut 22 is mounted upon the threaded portion of the rod and coöperates with the nut 19' to hold a drum 23 to said plate and rod, the said drum having its lower end tapering and provided with an opening 24 therein. The apertures 21 in said plate register with the annular space 25 intervening between the drum and sleeve and said drum is provided for the purpose of deflecting air against a cylindrical wick 24' which is held by means of screws 25' to the plate, said wick telescoping over the sleeve and movable thereon and into the chamber 20ˣ which is formed in the upper end of the casing.

A butterfly valve 26 is mounted upon a spindle 27 which is fastened to a handle 28, the lower portion of which is curved outwardly and has a spherical-shaped end 29 having a bearing in the boxing 30 which is held at the upper end of the rod 31 which in turn is fastened in a threaded socket in the forked member 32 carrying a pin 33 in the arm thereof which is movable in the curved slot 34 of the lever 35 which is pivotally mounted on the pin 36 carried by the arms of the forked member 37, which latter is fastened to the casing 1. A forked rod 38 is pivotally connected to the pin 33 and which rod is adapted to be connected to the quadrant or lever on the dash of a car or any other lever, but which is not illustrated as it forms no part of the present invention. The lever 35 has a forked end, the arms of which are pivotally connected to the links 39 which in turn are pivotally connected to the lower end of the rod 18. Said float is pivotally connected to one end of a lever 40 mounted upon the pivot pin 41 and the other end 42 of said lever is apertured to receive the stem of the needle valve 43 movable through the plug 44 mounted in a cap 45 in which it has threaded connection, and the spring 46 is interposed between a collar 47 upon the stem of the needle valve and the plug 44 and tends to bear yieldingly against the outer end of the lever. Said needle valve regulates the passage through which fuel is fed from the pipe 49. Said chamber 20× has an air passageway 50 passing entirely about the chamber and terminating in the auxiliary air valve chamber 51 in which a hollow boss 52 rises and which receives the stem 53 of the valve 54, a spring 55 bearing against the bottom of the auxiliary air chamber and said valve 54 and tending to hold the latter against the seat in the adjustable shell 56, which latter has threaded connection with the circumference of the auxiliary valve chamber.

In operation, in the event of there being any water in the gasolene, it will settle to the bottom of the reservoir and, by the adjustment of the rod 18, the cylindrical wick may be raised within the chamber 20× so that its opposite faces will be exposed to air entering the casing and, by capillary attraction, the pure gasolene, freed from dirt, sediment and water, will be mixed with the air, the gasolene being thereby prevented from being sprayed into the motor in a moist vapor as is the case with the ordinary type of nipple carbureters. The lower portion of the wick being above the line of any water which might be contained within the gasolene will prevent the water from being drawn up through the wick. By the utilization of a wick through which the fuel is drawn by capillary attraction, flooding of the carbureter will be prevented and the gasolene will be fed continuously as long as the wick trails into the same.

By the provision of the deflecting wall of the drum, it will be noted that the air entering through the apertures in the sleeve will be deflected against the inner surface of the wick while the air passing through the auxiliary passageway 50 will come in contact with the outer surface of the wick.

By the adjustments shown, it will be noted that the wick may be raised or lowered without the movement of the throttle, thereby increasing or diminishing the richness of the air and gasolene while, at the same time, the wick may be firmly controlled by any movement of the throttle in any adjustment in which it may be left by the mechanical setting from the dash.

By my improved form of carbureter, it has been demonstrated that the air being deflected against the outer and inner walls of the cylindrical wick a thoroughly carbureted mixture will be effected when the two volumes meet over the top of the wick before passing to the combustion chamber of the motor.

What I claim to be new is:

1. A carbureter having a fuel reservoir, a sleeve mounted therein, a wick within the reservoir and about the sleeve, a chamber into which the wick is movable, means for moving the wick, a deflecting member movable with the wick, a throttle, and connections between the same and the means for moving the wick.

2. A carbureter comprising a gasolene reservoir and means for regulating the supply of gasolene thereto, a sleeve mounted in a threaded opening in the reservoir and provided with an opening in the end thereof, a wick mounted within the reservoir and movable about the sleeve, an apertured plate secured to the wick, a rod secured to the plate, a chamber into which the wick is movable, a deflecting drum secured to the plate, a throttle valve in said chamber, connections between the same and said rod, and means for regulating the air passing through the sleeve.

3. A carbureter comprising a gasolene reservoir and means for regulating the supply of gasolene thereto, a sleeve mounted in a threaded opening in the reservoir and provided with an opening in the end thereof, a wick mounted within the reservoir and movable about the sleeve, an apertured plate secured to the wick, a rod secured to the plate, a chamber into which the wick is movable, a deflecting drum secured to the plate, a throttle valve in said chamber, connections between the same and said rod, a hollow screw fitted in said sleeve and through which said tube passes, a valve mounted about said hollow screw and a valve seat secured to the sleeve, a spring holding the valve against said seat.

4. A carbureter comprising a gasolene reservoir and means for regulating the supply of gasolene thereto, a sleeve mounted in a threaded opening in the reservoir and provided with an opening in the end thereof, a wick mounted within the reservoir and movable about the sleeve, an apertured plate secured to the wick, a rod secured to the plate, a chamber into which the wick is movable, a deflecting drum secured to the plate, a throttle valve in said chamber, connections between the same and said rod, a hollow screw fitted in said sleeve and through which said rod passes, a valve mounted about said hollow screw and a valve seat secured to the sleeve, a spring mounted about said hollow screw, a nut upon the latter, a spring interposed between said nut and valve.

5. A carbureter comprising a gasolene reservoir and means for regulating the supply of gasolene thereto, a sleeve mounted in a threaded opening in the reservoir and provided with an opening in the end thereof, a wick mounted within the reservoir and movable about the sleeve, an apertured plate secured to the wick, a rod secured to the plate, a chamber into which the wick is movable, a deflecting drum secured to the plate, a throttle valve in said chamber, connections between the same and said rod, a hollow screw fitted in said sleeve and through which said rod passes, a valve mounted about said hollow screw, a spring mounted upon the latter, a nut mounted upon the threaded portion of the hollow screw, a spring passing through an opening into said deflecting drum and bearing at one end against said nut and the other end against said valve, and a valve seat secured within the sleeve.

6. A carbureter comprising a gasolene reservoir and means for regulating the supply of gasolene thereto, a sleeve mounted in a threaded opening in the reservoir and provided with an opening in the end thereof, a wick mounted within the reservoir and movable about the sleeve, an apertured plate secured to the wick, a rod secured to the plate, a chamber into which the wick is movable, said chamber having an auxiliary air passage communicating therewith, a shell about the wall of said auxiliary air chamber, a spring-pressed valve in said shell, a deflecting drum secured to the plate, a throttle valve in said chamber, connections between the same and said rod, a hollow screw fitted in said sleeve and through which said rod passes, a valve mounted about said hollow screw, a spring mounted upon the latter, a nut mounted upon the threaded portion of the latter, a spring passing through an opening into said deflecting drum and bearing at one end against said nut and the other end against said valve, and a valve seat secured within the sleeve.

7. A carbureter comprising a gasolene reservoir with inlet duct, a spring-pressed needle valve for regulating the duct, a pivotal lever and float secured thereto, a sleeve mounted in a threaded aperture in the bottom of the reservoir, a cylindrical wick about said sleeve, an apertured plate secured to the wick, a rod secured to the plate, a hollow deflecting drum fastened to the plate, a hollow screw mounted in a threaded aperture in the end of the sleeve and through which said rod has a longitudinal movement, a valve upon said hollow screw, a seat for said valve secured to the sleeve, a nut fitted upon the threaded portion of the screw, a spring bearing against said nut and valve, a chamber into which the wick is movable, said chamber being provided with an auxiliary air passage and valve regulating the exit of mixture therefrom, a throttle valve, and connections between the same and said rod.

8. A carbureter comprising a gasolene reservoir with inlet duct, a spring-pressed needle valve for regulating the duct, a pivotal lever and float secured thereto, a sleeve mounted in a threaded aperture in the bottom of the reservoir, a cylindrical wick about said sleeve, an apertured plate secured to the wick, a rod secured to the plate, a hollow deflecting drum fastened to the plate, a hollow screw mounted in a threaded aperture in the end of the sleeve and through which said rod has a longitudinal movement, a valve upon said hollow screw, a seat for said valve secured to the sleeve, a nut fitted upon the threaded portion of the screw, a spring bearing against said nut and valve, a chamber into which the wick is movable, said chamber being provided with an auxiliary air passage and valve regulating the exit of mixture therefrom, a throttle valve, a pivotally mounted lever having an elongated slot, pivotal connections between the same and said rod, and sliding connections between said lever and throttle, and a forked rod connected to the connections between the lever and throttle.

In testimony whereof I hereunto affix my signature in presence of two witnesses.

THEODORE S. GLOVER.

Witnesses:
FRANCIS B. CANTWELL,
C. H. GOLDSMITH.